(12) United States Patent
Rae et al.

(10) Patent No.: US 8,584,004 B2
(45) Date of Patent: Nov. 12, 2013

(54) ASYNCHRONOUS USER DEFINED FUNCTIONS

(75) Inventors: Chris L. Rae, Seattle, WA (US);
Charles D. Ellis, Seattle, WA (US);
Jeffrey J. Duzak, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 930 days.

(21) Appl. No.: 12/107,959

(22) Filed: Apr. 23, 2008

(65) Prior Publication Data
US 2009/0271693 A1    Oct. 29, 2009

(51) Int. Cl.
*G06F 17/12* (2006.01)

(52) U.S. Cl.
USPC .......................................................... 715/219

(58) Field of Classification Search
USPC .......................................................... 715/219
See application file for complete search history.

(56) References Cited

U.S. PATENT DOCUMENTS

| | | | |
|---|---|---|---|
| 6,430,584 B1 | 8/2002 | Comer et al. | 715/212 |
| 6,754,701 B1 * | 6/2004 | Kessner | 709/219 |
| 6,898,760 B2 | 5/2005 | Bedford et al. | 715/205 |
| 7,047,484 B1 * | 5/2006 | Becker et al. | 715/201 |
| 7,099,890 B2 | 8/2006 | Cahill et al. | 707/103 R |
| 2003/0208537 A1 | 11/2003 | Lane et al. | 709/204 |
| 2004/0103366 A1 | 5/2004 | Peyton-Jones et al. | 715/213 |
| 2006/0036939 A1 | 2/2006 | Hobbs et al. | 715/213 |
| 2006/0129913 A1 | 6/2006 | Vigesaa et al. | 715/250 |
| 2006/0129929 A1 | 6/2006 | Weber et al. | 715/267 |
| 2006/0224946 A1 | 10/2006 | Barrett et al. | 715/210 |
| 2007/0260667 A1 * | 11/2007 | Duzak et al. | 708/521 |
| 2008/0243763 A1 * | 10/2008 | Bishop et al. | 707/2 |

OTHER PUBLICATIONS

Gainer, "Multi-threaded calculation in Excel, or 'how calculation can become much faster in Excel 12,'" MSDN Blogs, Nov. 3, 2005, http://blogs.msdn.com/excel/archive/2005/11/03/488822.aspx, pp. 1-6.
"Excel 2007 and CCS 2003," Windows HPC Community, retrieved Jul. 16, 2007, http://widowshpc.net/forums/thread/533.aspx, pp. 1-4.
Developing User-Defined Functions for Microsoft Office Excel 2007 and Excel Services, 2007, http://officeblogs.net/excel/UDFs%20for%20Excel%20client%20and%20server.doc, pp. 1-19.
Wierer, "Performance and Reliability for Excel Spreadsheets through High Performance Computing," Mar. 2007, http://download.microsoft.com/download/a/7/9/a7968349-921bc-44c-9876-f4c725d817c4/
Performance%20and%20Reliability%20for%20Excel-%20through%20HPC%20Industry%20Whitepaper.doc, pp. 1-27.

* cited by examiner

*Primary Examiner* — Doug Hutton, Jr.
*Assistant Examiner* — Tionna Smith
(74) *Attorney, Agent, or Firm* — Merchant & Gould

(57) ABSTRACT

A framework for enabling users to create User Defined Functions (UDFs), which can run simultaneously without using multiple calculation threads, is provided. A calculation engine continues a remainder of calculation operations independent of a pending asynchronous function upon starting to run the asynchronous function without waiting to receive a result. The result value is introduced to the computation at a later time during the calculation cycle, when it is received or completed by the calculation engine. When the results are received, downstream operations such as dependent functions are calculated without changing a flow of dependencies within the operations.

17 Claims, 8 Drawing Sheets

ASYNCHRONOUS USER DEFINED FUNCTIONS

BACKGROUND

Spreadsheets are used in a large variety of circumstances for different purposes. For example, businesses often perform analyses of budgeting and forecasting operations, or simply gather business metrics. While many spreadsheet applications include a number of default functions for simple to complicated calculations, user defined functions are also a common aspect of spreadsheet applications.

Many user defined functions (or default functions) involve computations that can be completed completely within the spreadsheet application and without requiring extensive processing power. On the other hand, some functions may involve operations that require extensive processing or use of external resources such as external data stores or computational resources. For such functions, spreadsheet computation may slow down or come to a halt if the wait for computing the function is long. Some user may rather not use up a spreadsheet calculation thread while waiting. This is important for situations such as external data feeds, or in the High Performance Computing (HPC) field, where users may like to launch remote calculations on an HPC grid without blocking spreadsheet calculations.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to a framework for enabling users to create User Defined Functions (UDFs) which can run simultaneously without using multiple calculation threads. The UDFs may return control to a calculation engine immediately to continue the remainder of calculation operations, and provide a result value at a later time during the calculation cycle. When the results come back, downstream operations (e.g. dependent functions) may be calculated.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

As briefly discussed above, asynchronous functions in a spreadsheet may be run simultaneously without using multiple calculation threads. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network. In a distributed computing environment, program modules may be located in both local and remote memory storage devices.

Embodiments may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

Figure 1:
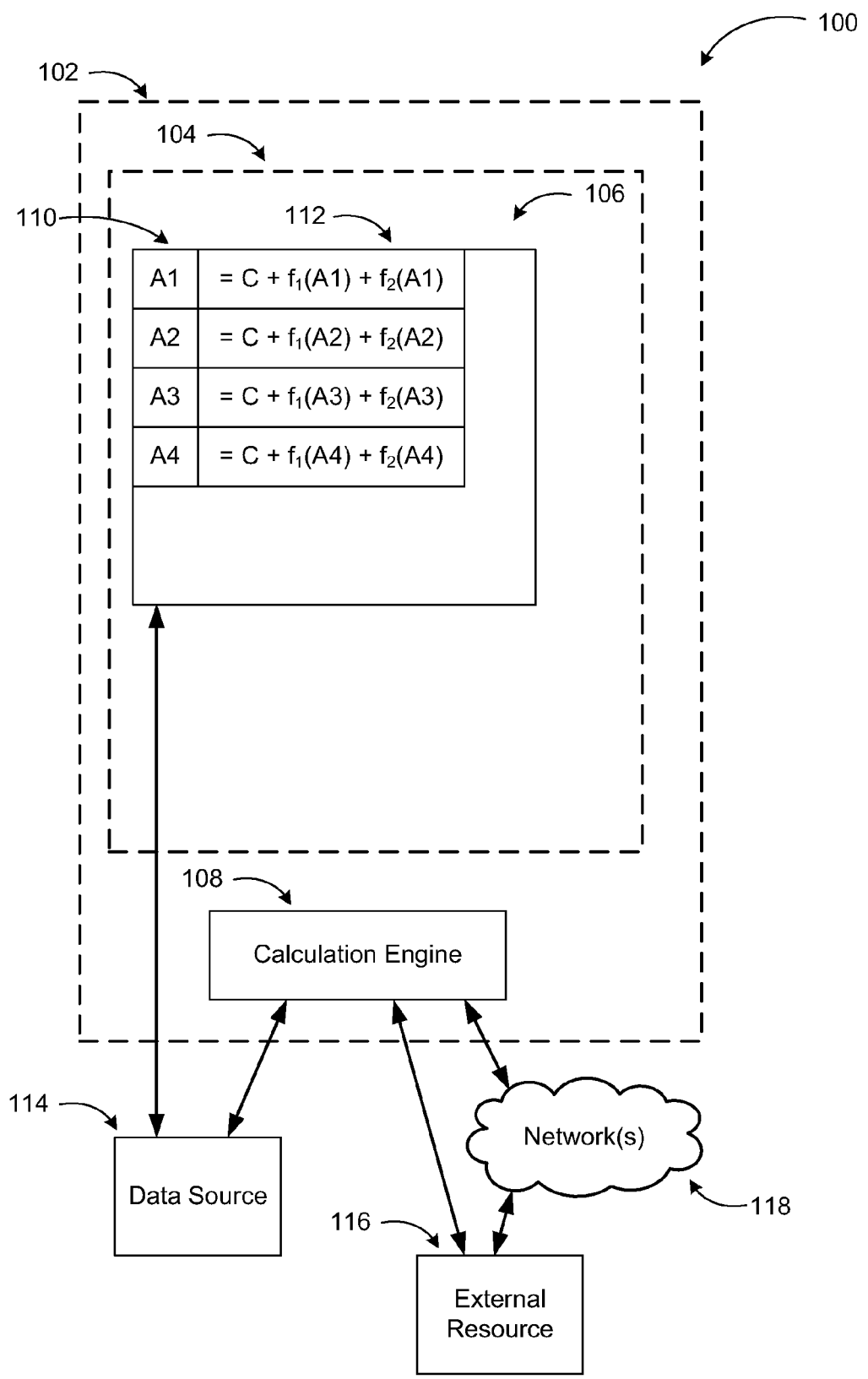
FIG. 1 is a conceptual diagram illustrating an example spreadsheet and interaction of system components in computation of different types of spreadsheet functions.

Referring to FIG. 1, conceptual diagram 100 of an example spreadsheet and interaction of system components in computation of different types of spreadsheet functions, is illustrated. User Defined Functions (UDFs) are custom functions that extend the calculation and data-import capabilities of spreadsheets. Developers may create UDFs to provide functions that are not built into the spreadsheet, custom implementations to built-in functions, and custom data feeds for legacy or unsupported data sources and application-specific data flows. Examples of UDFs include custom mathematical, financial functions, data retrieval from data sources, calls to web services, and the like.

As discussed above, some UDFs may involve operations that require extensive processing or use of external resources such as external data stores or computational resources. Thus, such functions may cause delays in spreadsheet calculations that may not be acceptable to users, and may therefore have to be executed differently. One conventional approach to handling these "asynchronous" functions is simply waiting until the execution of the function returns its result, which as mentioned may not be acceptable. Another approach is using dedicated threads for each asynchronous function. Dedicating threads to UDFs may, however, cause a decrease in application and/or system performance. A further approach is use of Real Time Data (RTD) server. An RTD function retrieves data from an RTD server for use in the spreadsheet. The function result may be updated whenever new data becomes available from the RTD server and the spreadsheet can accept it. The RTD server may wait until the spreadsheet application is idle before updating. However, RTD is a continuous data feed—if a developer were to create an RTD server which returned an interim result and then after some period of time returned its final result, there may be no way for the end user to know which result they are looking at.

In a spreadsheet application according to embodiments, users are enabled to create and call their own asynchronous UDFs. These UDFs may return control to the spreadsheet application immediately to continue the rest of calculation, but provide a result value at a later time during the calculation cycle using a callback. When the results come back, the spreadsheet application may calculate downstream cells such as those including dependent functions.

In FIG. 1, spreadsheet application 102 is shown with two main components. User interface 104 displaying spreadsheet 106 and calculation engine 108 for performing computations on functions defined within spreadsheet 106. Spreadsheet 106 is shown with two example columns. Column 110 includes user provided (or loaded through another mechanism) values (e.g. A1, A2, A3, A4). Column 112 includes example computations involving multiple functions based on the values of column 110. For example, the first cell of column 112 is computed based on adding a constant value, a first function $f_1(A1)$ and a second function $f_2(A1)$. The constant "C" is a value that may be predefined or retrieved by the spreadsheet application quickly. Therefore, it is an example of non-asynchronous function. First function $f_1$ may also be a non-asynchronous function not requiring extensive processing or external resources. Thus, $f_1$ may be computed during regular flow of calculation without special handling. On the other hand, $f_2$ may be an asynchronous function requiring either extensive processing or an external resource such as a remote data source. In the case of $f_2$, calculation engine 108 may have to retrieve data from data source 114 or access external resource 116 directly or through network(s) 118. Therefore, $f_2$ may have to be handled specially to prevent an unacceptable delay in overall spreadsheet computations. Details of the interactions between these example components are discussed below.

Figure 2:
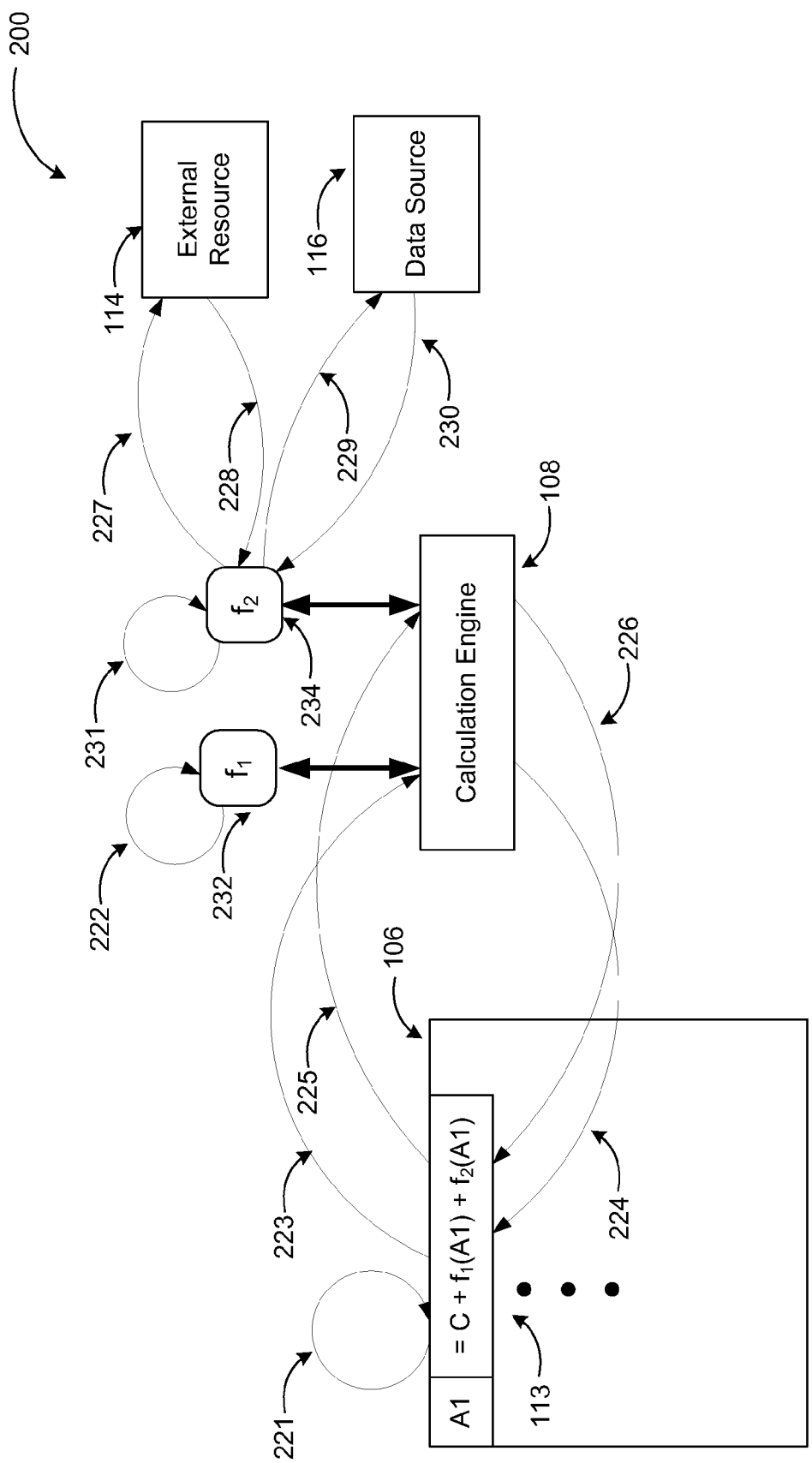
FIG. 2 is a conceptual diagram illustrating various computation possibilities of different spreadsheet functions of FIG. 1.

FIG. 2 is a conceptual diagram illustrating various computation possibilities of different spreadsheet functions of FIG. 1. In a system according to embodiments, asynchronous functions may be handled differently depending on their type and the resource used. Example cell 113 of spreadsheet 106 is shown with typical operations performed by the spreadsheet application and its calculation engine 108.

As discussed above constant value "C" may be predefined or easily retrieved within the spreadsheet application as shown by process 221. Non-asynchronous function $f_1$ (232) may also be computed by the spreadsheet application with the involvement of calculation engine 108 (processes 222 and 223+224) but without involvement of an external resource or data source.

Asynchronous function $f_2$ (234), on the other hand, involves processes that may prolong the computation within spreadsheet 106. Calculations associated with this function may be scheduled to be executed on one or more processors (process 231) and results returned later in the calculation cycle (process 226). If $f_2$ (234) is a function requiring the use of an external resource 114, such as a web service, the function may submit a request to external resource 114 (process 227) and when the requested information is received (process 228) return the result again through process 226.

If $f_2$ (234) is a function requiring information from a data source (e.g. 116), which may not be readily available or promptly retrievable, the function may submit the request to data source 116 (process 229) and return the result to the spreadsheet (process 226) after receiving the requested information from the data source (process 230). An example for this latter case may be submitting a query to a database, which may take a while to execute and receive the result of. The asynchronous operations associated with function $f_2$ (234) and their return to the spreadsheet are managed by calculation engine 108.

While the example systems and applications in FIGS. 1 and 2 have been described with specific components such as calculation engine, external resource, data source, and the like, embodiments are not limited to these components or configurations and can be implemented with other system configuration employing fewer or additional components. Functionality of an application handling asynchronous functions without changing a flow of dependencies may also be distributed among the components of the systems differently depending on component capabilities and system configurations.

Figure 3:
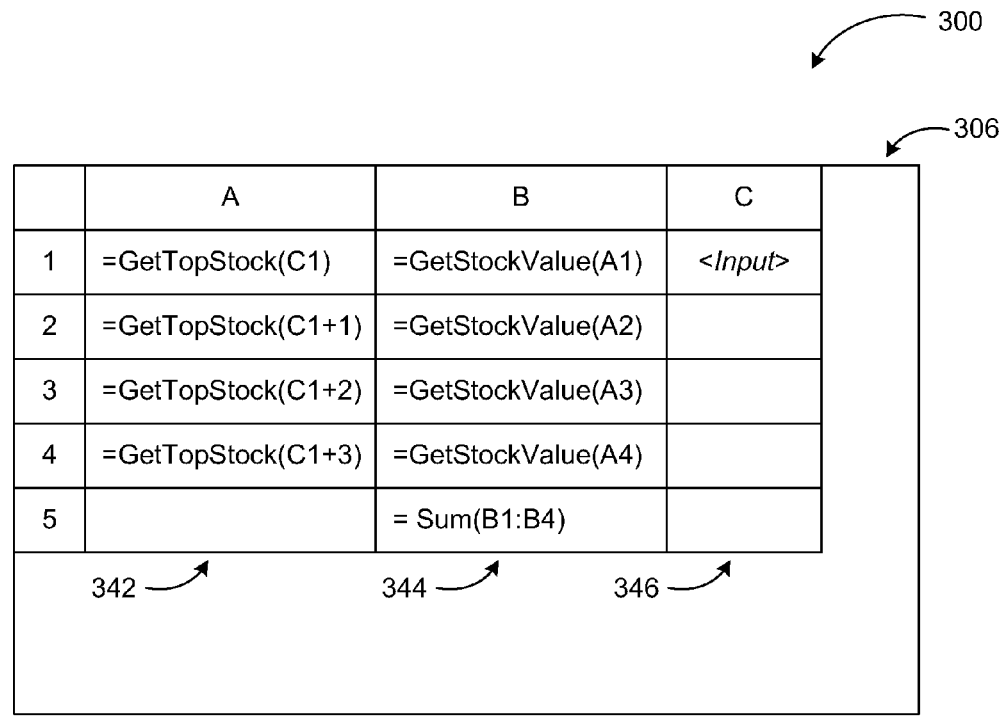
FIG. 3 illustrates example independent and dependent asynchronous user defined functions and their computational order.
Figure 3:
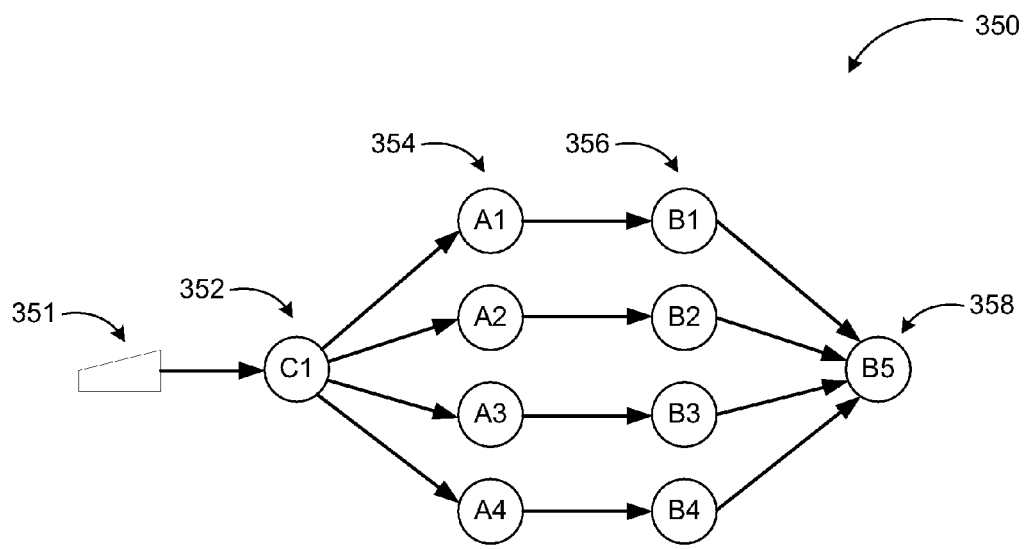

FIG. 3 illustrates example independent and dependent asynchronous user defined functions and their computational order. In the example spreadsheet 306 of diagram 300, first column 342 (A) includes four functions that are designed to retrieve a top performing stock symbol based on a user defined value in the first cell of third column 346 (C). Thus, if the user wants to get the top performing stocks starting at stock number 14, they would enter 14 in cell C1 and cells A1 through A4 would be populated with symbols of stocks 15, 16, 17, and 18 according to their performance order. This population occurs, of course, after the stock symbols are received from an external resource such as a web service providing stock performance information.

The second column 344 (B) includes additional asynchronous functions with different dependencies. For example, cells B1 through B4 have UDFs designed to retrieve the current stock values for the stocks defined in corresponding cells A1 through A4. Cell B5, on the other hand, computes the sum of the four stock values listed in cells B1 through B4. Thus, the function in B5 is a non-asynchronous function, but it depends on the results of the asynchronous functions in cells B1 through B4 having been returned.

Diagram 350 of FIG. 3 illustrates the dependencies between the cells. Cell C1 (352) depends on input 351 (definition of where the stock symbols should begin in the performance order). Once C1 is determined (through user input or an internal mechanism that may retrieve the input from another computation or source), cells A1 through A4 (354) may be computed by submitting the asynchronous "GetTopStock" function to an external resource and receiving the results. Cells B1 through B4 (356) depend on the corresponding cells in A column. Therefore, their asynchronous functions "GetStockValue" may not be computed until the computation for the corresponding A cell is complete.

Figure 4:
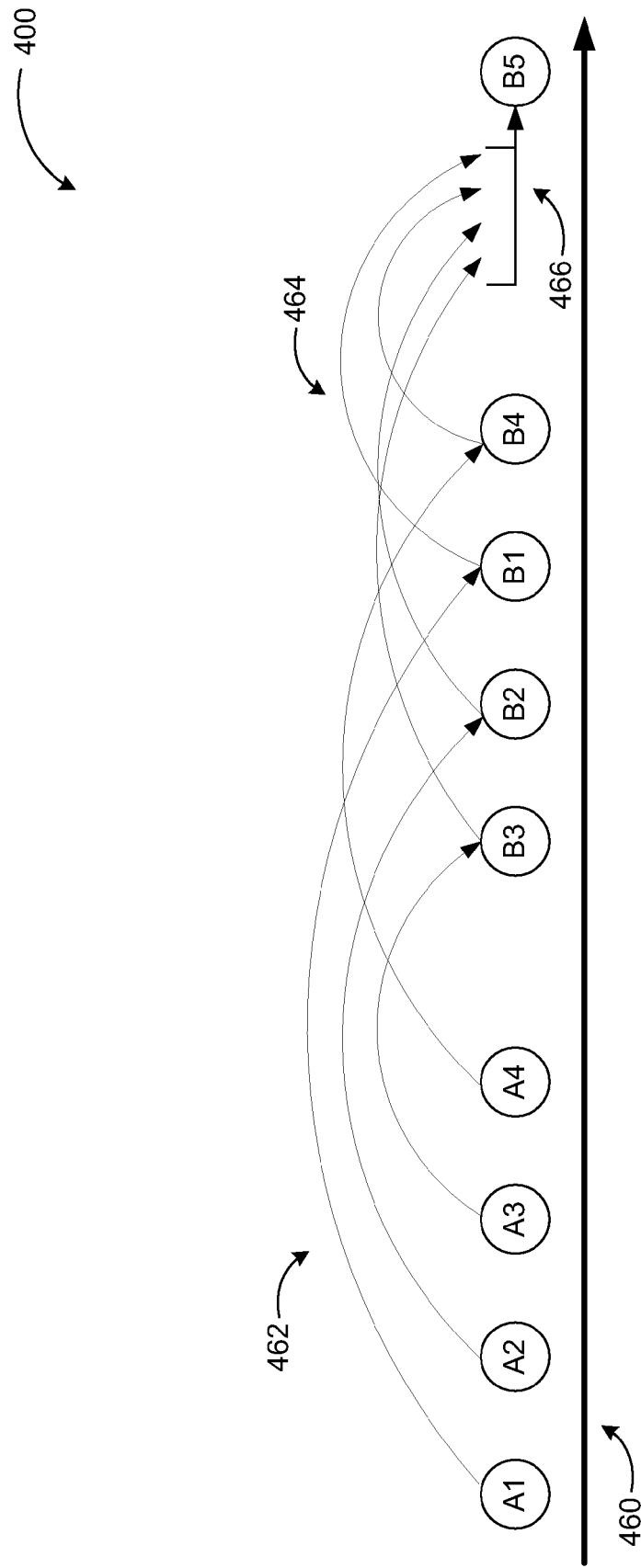
FIG. 4 is a conceptual diagram illustrating an example order of calculation for the example UDFs of FIG. 3 according to embodiments.

Cell B5 (358), as explained above, is dependent on all of the B1-B4 cells being populated. Thus, when all results of the "GetStockValue" functions have been returned, the calculation engine may begin computing B5. The functions and dependencies discussed in FIG. 3 and below in conjunction with FIG. 4 are for example purposes only and do not constitute a limitation on embodiments. Other functions, orders, and dependencies may be employed using the principles described herein.

FIG. 4 is a conceptual diagram illustrating an example order of calculation for the example UDFs of FIG. 3 according to embodiments. The example order of processes in diagram 400 are based on an example assumption of result returns and may be different based on functions, external resource(s) employed, processing power, spreadsheet particulars, and the like.

Computations of cells A1 through A4 are shown along timeline 460 assuming the computations begin in descending order. Results of asynchronous functions for the cells A1 through A4 are returned as shown by arrows 462. The results may not be received in the order the requests were submitted. For example, the result for A1 may be received first, followed by the result for A2, then A1, and finally A4. Thus, the asynchronous functions of cells B1 through B4 are initiated (requests submitted) in the order the results for A1 through A4 are received (e.g. B3, B2, B1, and B4).

The submittal of the asynchronous function requests for the B-cells is illustrated by arrows 464. The results for these processes may again be received not necessarily in the order they were submitted. Therefore, any downstream computations may have to be scheduled based on the return time of each of these results. In the example spreadsheet of FIG. 3, the last calculation is the sum of all B-cells. Thus, before the non-asynchronous function for B5 can be computed, all results for B1 through B4 must be received (466). The user may not be given edit control of the spreadsheet until all asynchronous functions are complete (or calculation is cancelled).

Figure 5:
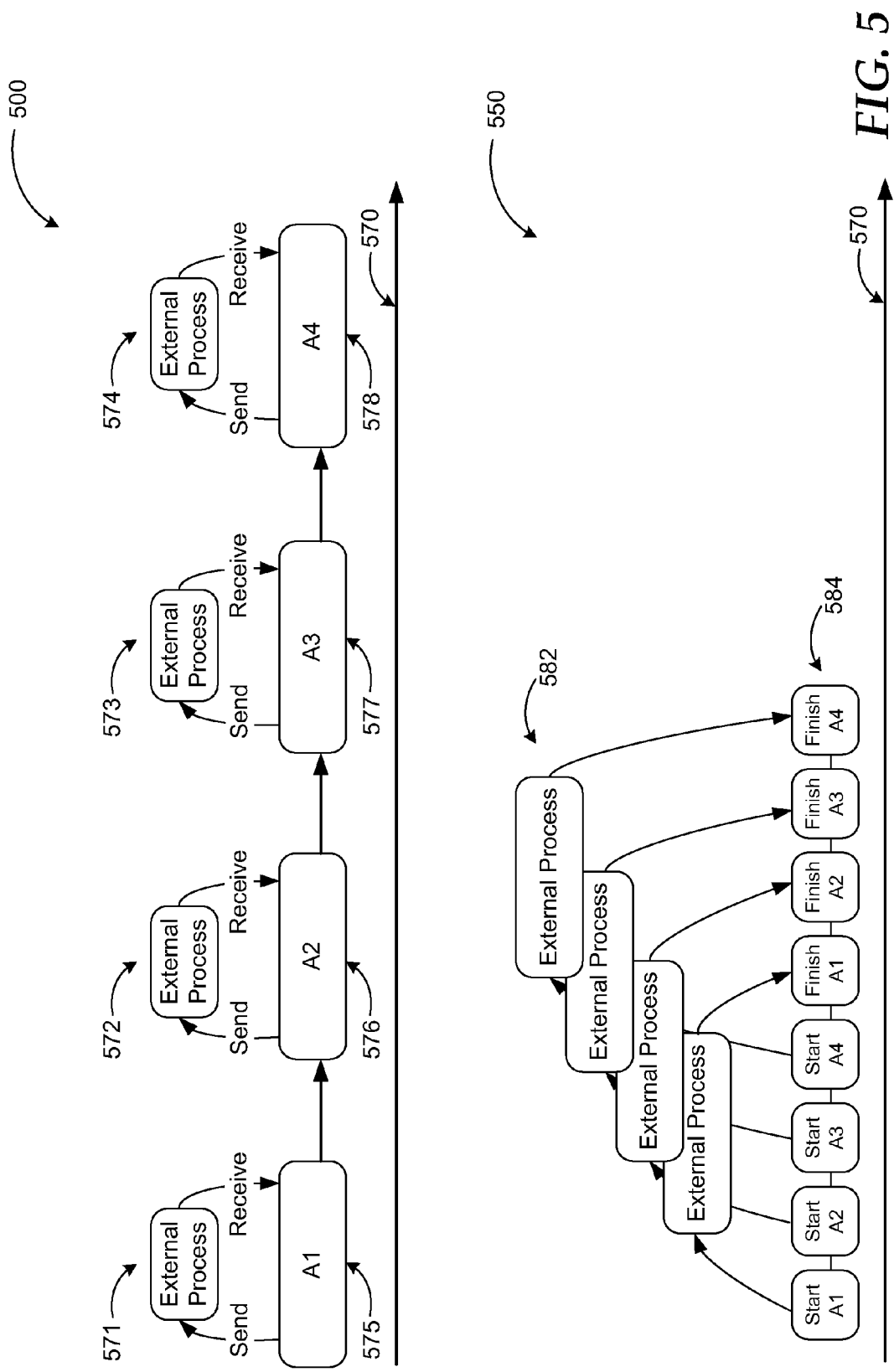
FIG. 5 illustrates differences between UDFs run serially and asynchronously according to embodiments.

FIG. 5 illustrates differences between UDFs run serially and asynchronously according to embodiments. Diagram 500 shows UDFs 575 through 578 (from cells A1 through A4), each of which require a corresponding external process (571 through 574) executed serially. Thus, each function has to wait for the previous one to receive its result from the external process. Therefore, the entire calculation shown against timeline 570 may take a long period.

Diagram 550, on the other hand, shows the UDFs initiating their corresponding external processes (582) without waiting for the preceding function to have its results returned. Thus, the UDFs may be represented as independently ordered start and finish blocks of the UDFs (584). The UDFs in diagram 550 are shown in order of A1 through A4, but embodiments are not limited to ordered functions. As discussed previously, the UDFs may be executed in any order. Furthermore, the UDFs may be dependent from each other depending on their definition. In case of dependent functions, a dependent function would have to wait for its parent function to be completed before initiating its external process. As the diagram represents, significant computational time saving may be achieved by running the UDFs asynchronously.

In order to manage the asynchronous functions as discussed, events or callbacks may be implemented within a spreadsheet such as declaring a function as asynchronous through a declaration flag (this may be done by the developer designing the UDF or the application itself), returning a value (result) from a single or multiple asynchronous function calls through predefined method(s), and retrieving an asynchronous handle. Additionally, end of a calculation or cancellation of a calculation may be detected through predefined events in order to prevent an endless loop in spreadsheet computations.

Asynchronous UDFs may be declared asynchronous at design time. A managed spreadsheet function may declare itself as asynchronous using an asynchronous flag on the method declaration. An example code is provided below of an asynchronous function which waits for a given number of milliseconds. The function does this by creating a timer object and providing the function's response from inside the timer's tick event.

```
[UdfMethod(Asynchronous=True)]
Public ExcelAsynchronousContext MyEAH;
void WaitSeconds(double mstowait)
{
    MyEAH = ExcelContext.Current.GetAsynchronousContext;
    System.Timers.Timer aTimer = new System.Timers.Timer( );
    // Hook up the Elapsed event for the timer.
    aTimer.Elapsed += new ElapsedEventHandler(OnTimedEvent);
    // Set the Interval to mstowait milliseconds.
    aTimer.Interval = mstowait;
    aTimer.Enabled = true;
}
```

As discussed above, events to indicate the progress of calculation such as end of calculation or cancellation of calculation may be provided. The calculation end event may be provided at the very end of calculation when all results are returned. For example, multiple functions may be submitted to a service that requires authentication. To prevent repeated authentication processes, a one-time authentication may be followed by submittal of all related requests. Since the calculation engine cannot foretell when all results will be returned, it may rely on the calculation end event. Calculation cancellation event may be used to address the situation when the computation is interrupted by the user (or by a predefined time-out). A cancellation flag may be checked periodically by the calculation engine to determine whether pending computations should be stopped or not. According to one embodiment, the calculation cancellation event may be usable only in conjunction with a calculation end event (i.e. both must be declared for the calculation cancellation event to be accepted).

Figure 6:
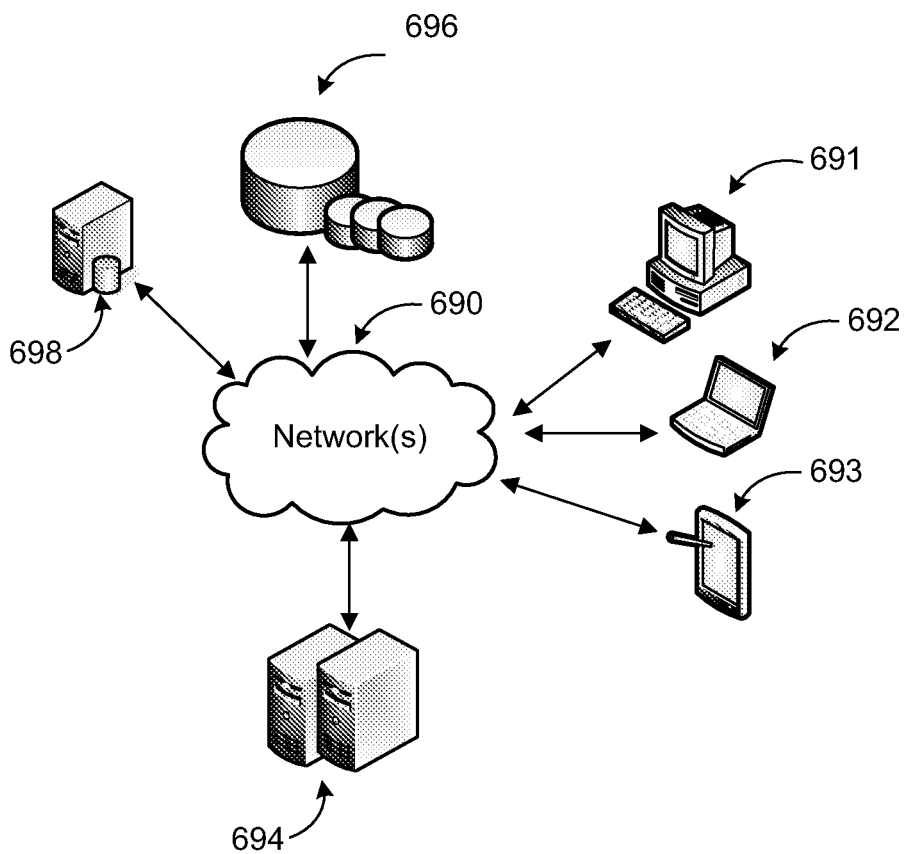
FIG. 6 illustrates a networked environment where embodiments may be implemented.

FIG. 6 is an example networked environment, where embodiments may be implemented. A framework for enabling users to create UDFs to be run simultaneously without using multiple calculation threads, as those described previously, may be implemented locally or in a distributed manner over a number of physical and virtual clients and servers. Such a system may typically involve one or more networks such as network(s) 690.

A system according to embodiments may comprise any topology of servers, clients, Internet service providers, and communication media. Also, the system may have a static or dynamic topology. The term "client" may refer to a client application or a client device. While handling asynchronous functions in spreadsheet applications according to embodiments may involve many more components, typical and relevant ones are discussed in conjunction with this figure.

A spreadsheet application performing simultaneous execution of multiple asynchronous functions without using multiple calculation threads may be executed in any one of the client devices 691-693. Such a spreadsheet application may also be executed on a server such as one of servers 694 and accessed through a hosted service by any of the client devices 691-693. As explained previously, management of asynchronous functions is not limited to spreadsheet applications, and may also be implemented in other types of applications such as word processing applications, presentation applications, browsing applications, and the like, in similar fashion.

One or more of servers 694 may host an external resource for the asynchronous function as discussed above and be accessed during the calculation of the asynchronous function. Furthermore, data sources such as data stores 696 may be directly or indirectly (through database server 698) accessed for calculation of the asynchronous function(s). During the performance of these operations clients 691-693, servers 694, and data stores 696 may communicate through network(s) 690.

Network(s) 690 may include a secure network such as an enterprise network, an unsecure network such as a wireless open network, or the Internet. Network(s) 690 provides communication between the nodes described herein. By way of example, and not limitation, network(s) 690 may include wired media such as a wired network or direct-wired connection, and wireless media such as acoustic, RF, infrared and other wireless media.

Many other configurations of computing devices, applications, data sources, data distribution systems may be employed to implement management of asynchronous functions in spreadsheet (and other) applications. Furthermore, the networked environments discussed in FIG. 6 are for illustration purposes only. Embodiments are not limited to the example applications, modules, or processes.

Figure 7:
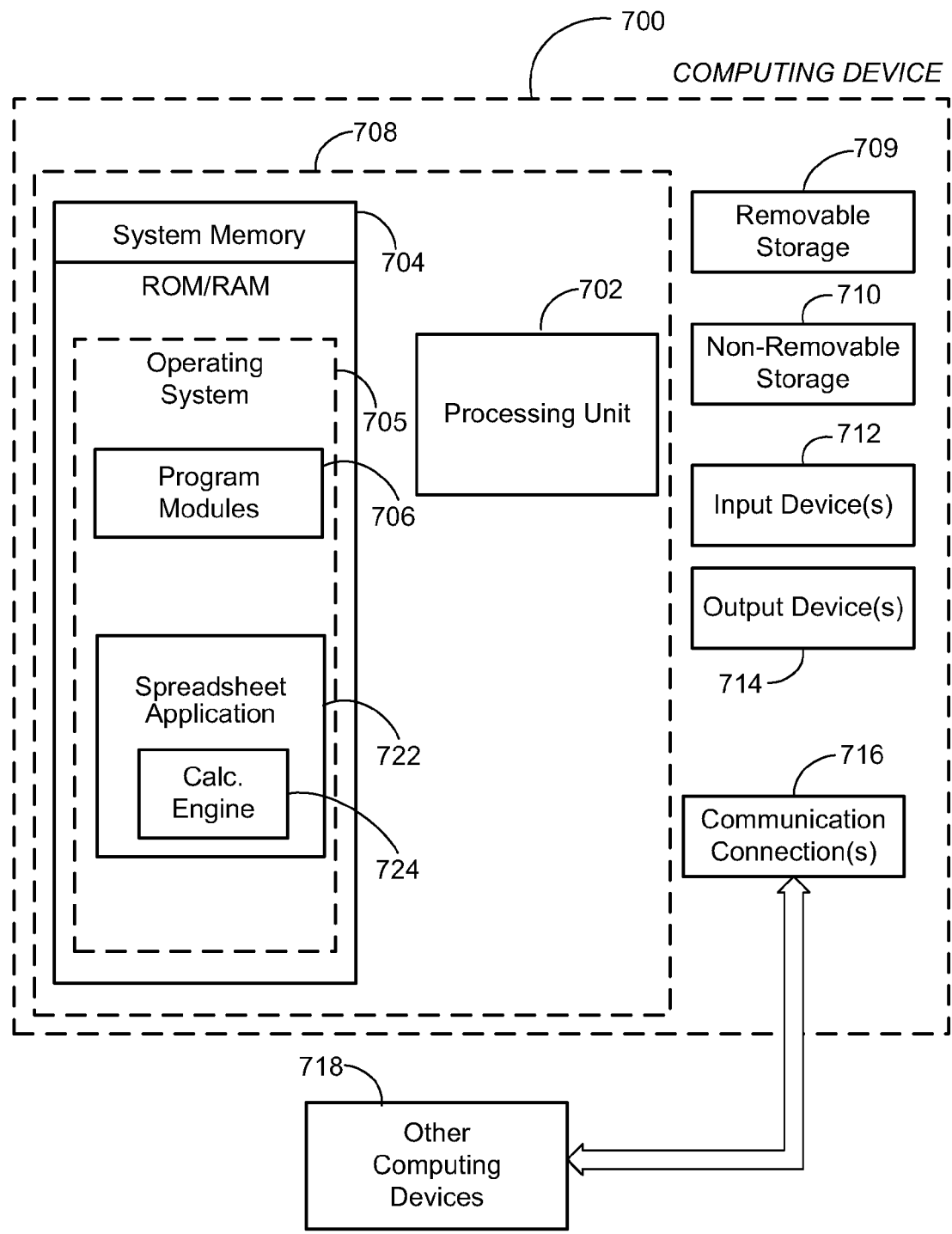
FIG. 7 is a block diagram of an example computing operating environment, where embodiments may be implemented.

FIG. 7 and the associated discussion are intended to provide a brief, general description of a suitable computing environment in which embodiments may be implemented. With reference to FIG. 7, a block diagram of an example computing operating environment is illustrated, such as computing device 700. In a basic configuration, the computing device 700 may be a computer executing a spreadsheet application capable of managing asynchronous functions according to embodiments. Computing device 700 may typically include at least one processing unit 702 and system memory 704. Computing device 700 may also include a plurality of processing units that cooperate in executing programs. Depending on the exact configuration and type of computing device, the system memory 704 may be volatile (such as RAM), non-volatile (such as ROM, flash memory, etc.) or some combination of the two. System memory 704 typically includes an operating system 705 suitable for controlling the operation of the computing device, such as the WINDOWS® operating systems from MICROSOFT CORPORATION of Redmond, Wash. The system memory 704 may also include one or more software applications such as program modules 706, spreadsheet application 722, and calculation engine 724 of the spreadsheet application.

Spreadsheet application 722 may be a separate application or an integral module of a hosted service application that provides spreadsheet computation services through computing device 700. As discussed above, spreadsheet application 722 may enable users to define UDFs which can run simultaneously without using multiple calculation threads, return control to a calculation engine immediately to continue the remainder of calculation operations, and provide a result value at a later time during the calculation cycle.

Calculation engine 724 may be an integrated module within spreadsheet application 722 coordinating computation of functions, managing of returned values, and updating of spreadsheet documents. This basic configuration is illustrated in FIG. 7 by those components within dashed line 708.

The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by removable storage 709 and non-removable storage 710. Computer storage media may include volatile and non-volatile, removable and non-removable media implemented in any method or technology for storage of information, such as computer readable instructions, data structures, program modules, or other data. System memory 704, removable storage 709 and non-removable storage 710 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media may be part of device 700. Computing device 700 may also have input device(s) 712 such as keyboard, mouse, pen, voice input device, touch input device, etc. Output device(s) 714 such as a display, speakers, printer, etc. may also be included. These devices are well known in the art and need not be discussed at length here.

The computing device 700 may also contain communication connections 716 that allow the device to communicate with other computing devices 718, such as over a wireless network in a distributed computing environment, for example, an intranet or the Internet. Other computing devices 718 may include servers, data stores, and other external resources as discussed above. Communication connections 716 are one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

The claimed subject matter also includes methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 8:
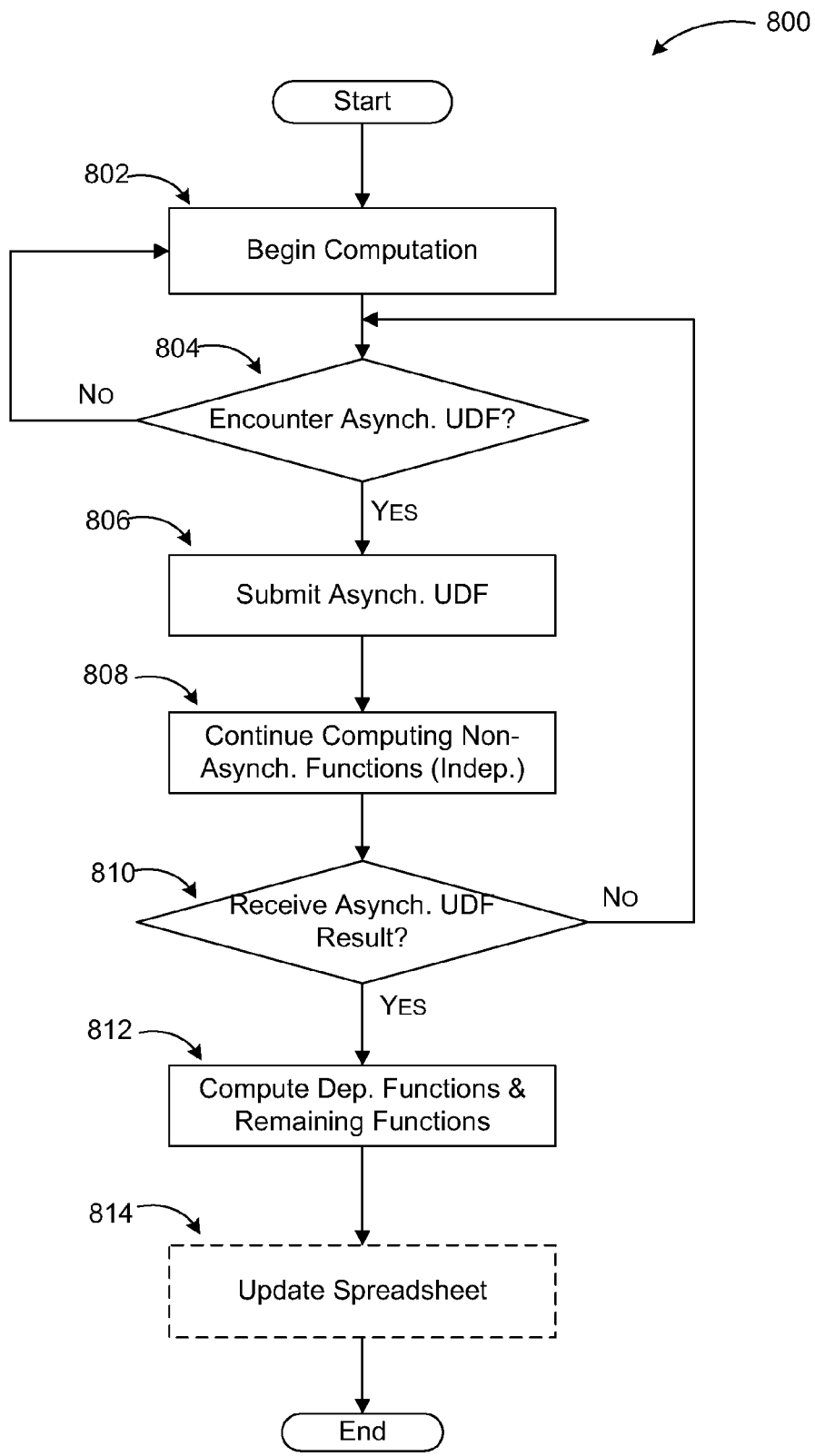
FIG. 8 illustrates a logic flow diagram for a process of handling asynchronous functions in a spreadsheet according to embodiments.

FIG. 8 illustrates a logic flow diagram for process 800 of handling asynchronous functions in a spreadsheet according to embodiments. Process 800 may be implemented in a spreadsheet application.

Process 800 begins with operation 802, where computation of one or more functions is started in a spreadsheet application. As discussed above, similar operations may be performed in other types of applications as well. Processing advances from operation 802 to decision operation 804.

At decision operation 804, a determination is made whether an asynchronous function (e.g. a UDF) is encountered. Non-asynchronous functions may be computed following standard spreadsheet operations, since these typically do not involve external resources or extensive processing power such that their execution may delay the spreadsheet calculations. If an asynchronous function is encountered, processing advances to operation 806 where the asynchronous function is started by the calculation engine. The asynchronous function may involve gathering of data from a data store, use of an external resource, or relatively prolonged processing time. Processing moves from operation 806 to operation 808.

At operation 808, non-asynchronous functions, which are not dependent from a result of a pending (currently being computed) asynchronous function, are computed. If other asynchronous functions are encountered during this operation, they may also be started as in operation 806. Functions that are dependent on results of pending asynchronous functions are not computed at this point. Processing moves from operation 808 to decision operation 810.

At decision operation 810, a determination is made whether a result for a pending asynchronous function is received. If no result is received yet, computing is continued until another asynchronous function is encountered as described in decision operation 804. If a result is received, processing continues to operation 812, where dependent asynchronous and non-asynchronous functions are computed based on the received result.

When all computations are completed, processing may proceed to optional operation 814, where the spreadsheet is updated based on the performed computations and received results. The significant aspect of an application according to claims is that the asynchronous functions do not change a flow of dependencies within the spreadsheet operations.

The operations included in process 800 are for illustration purposes. Managing asynchronous functions in a spreadsheet or similar application may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device for managing asynchronous functions within a spreadsheet application, the method comprising:
    initiating computations within a spreadsheet, the computations including the simultaneous execution of multiple asynchronous functions using a single calculation thread when an asynchronous function is encountered during the computations, beginning an execution of the asynchronous function, wherein the asynchronous function involves extensive processing causing a prolonged delay in the computations, wherein the asynchronous function further involves retrieval of data from a data source;
    continuing the computations involving functions independent from the asynchronous function being executed without waiting for a result of the asynchronous function execution to be returned;
    periodically checking a cancellation flag to determine whether pending computations should be stopped;
    providing a calculation cancellation event in response to receiving an interrupt to prevent an endless loop in the computations;
    when the result of the asynchronous function execution is returned, continuing the computations involving functions dependent from the asynchronous function and any remaining functions that have not yet been executed;
    when the computations are completed, updating the spreadsheet; and
    presenting the updated spreadsheet by displaying through a user interface associated with the spreadsheet application.

2. The method of claim 1, wherein the data source is external to the spreadsheet application.

3. The method of claim 1, wherein continuing the computations involving functions independent from the asynchronous function being executed without waiting for a result of the asynchronous function execution to be returned includes maintaining a flow of dependencies between the functions being computed within the spreadsheet.

4. The method of claim 1, wherein the functions independent from the asynchronous function being executed include asynchronous and non-asynchronous functions, and the method further comprises:
    saving results of any calculated non-asynchronous functions while a result of the asynchronous function is pending such that the calculated non-asynchronous functions are not re\-calculated when the result of the asynchronous function is received and further computations are performed in the spreadsheet.

5. The method of claim 1, further comprising:
if another asynchronous function is encountered during the computations, repeating the process of continuing the computations involving functions independent from the other asynchronous function being executed without waiting for a result of the other asynchronous function execution to be returned and continuing the computations involving functions dependent from the other asynchronous function and any remaining functions that have not yet been executed upon receiving the result of the execution of other asynchronous function, wherein the computations for the other asynchronous function and the computations for the another asynchronous function are executed without regard to a numbered order in a grouping of asynchronous functions comprising at least the other asynchronous function and the another asynchronous function.

6. The method of claim 1, further comprising:
providing data associated with the completed computations to another application.

7. The method of claim 1, further comprising:
providing at least a portion of the updated spreadsheet to a user through one of:
printing, audio presentation, and storing in a predefined data store.

8. The method of claim 1, wherein the asynchronous function is one of: a mathematical function, a non-mathematical function, and database query.

9. The method of claim 1, wherein the asynchronous function is a User Defined Function (UDF) for financial operations.

10. A computer-readable storage device comprising a memory with instructions stored thereon for managing asynchronous functions within a software application, the instructions comprising:
    initiating computations within a document being processed by the software application, the computations including a plurality of non-asynchronous and asynchronous functions, the computations including the simultaneous execution of the plurality of asynchronous functions using a single calculation thread, wherein the asynchronous functions involve extensive processing causing a prolonged delay in the computations, wherein the asynchronous function further involves retrieval of data from a data source;

when an asynchronous function is encountered during the computations, beginning an execution of the asynchronous function;

continuing the computations involving functions independent from the asynchronous function being executed without waiting for a result of the asynchronous function execution to be returned while maintaining a flow of dependencies between the functions being computed within the document;

when the result of the asynchronous function execution is received, continuing the computations involving functions dependent from the asynchronous function and any remaining functions that have not yet been executed;

periodically checking a cancellation flag to determine whether pending computations should be stopped;

providing a calculation cancellation event in response to receiving an interrupt to prevent an endless loop in the computations; and when the computations are completed, providing computation results to the document.

11. The computer-readable storage device of claim 10, wherein the UDF is declared as an asynchronous UDF employing a declaration flag at design time.

12. The computer-readable storage device of claim 10, wherein the result of the asynchronous UDF execution is returned employing at least one callback through predefined methods.

13. The computer-readable storage device of claim 10, wherein executing the asynchronous UDF further includes retrieving an asynchronous handle.

14. The computer-readable storage device of claim 10, wherein the instructions further comprise:
providing a calculation end event when all asynchronous UDF execution results are returned.

15. The computer-readable storage device of claim 10, wherein the software application includes one of: a spreadsheet application, a word processing application, a browsing application, and a database management application.

16. A computing device for managing asynchronous User Defined Functions (UDFs) within a spreadsheet application, the computing device comprising:
a memory;
a processor coupled to the memory configured to run the spreadsheet application, the spreadsheet application including a spreadsheet, a user interface, and a single calculation engine, wherein the spreadsheet includes a plurality of functions comprising multiple asynchronous UDFs, and wherein the calculation engine is configured to:

initiate computations comprising executing the plurality of functions, the computations including the simultaneous execution of the multiple asynchronous functions using a single calculation thread, wherein each asynchronous UDF involves extensive processing causing a prolonged delay in the computations, wherein each asynchronous UDF further involves retrieval of data from a data source;

when an asynchronous UDF is encountered during the computations, begin an execution of the asynchronous UDF;

continue the computations involving functions independent from the asynchronous UDF without waiting for a result of the asynchronous UDF execution to be returned while maintaining a flow of dependencies between the functions being computed;

periodically check a cancellation flag to determine whether pending computations should be stopped;

provide a calculation cancellation event in response to receiving an interrupt to prevent an endless loop in the computations;

when the result of the asynchronous UDF execution is received, continue the computations involving functions dependent from the asynchronous UDF and any remaining functions that have not yet been executed; and when the computations are completed, provide computation results to the spreadsheet; and a display device for displaying the spreadsheet through the user interface.

17. The computing device of claim 16, wherein the spreadsheet application is part of a hosted service accessible by a plurality or remote clients.

* * * * *